Sept. 30, 1969 M. B. PEARCE, JR 3,469,490
SELF-SEALING MECHANICAL FASTENER
Filed Oct. 18, 1967
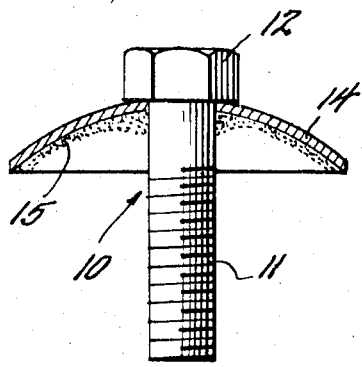
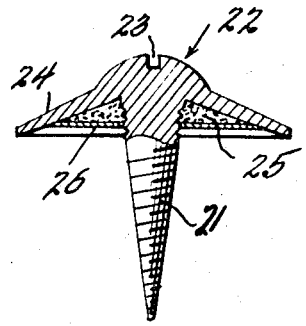
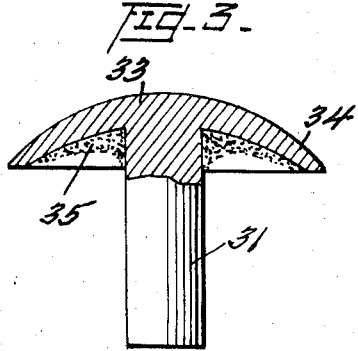
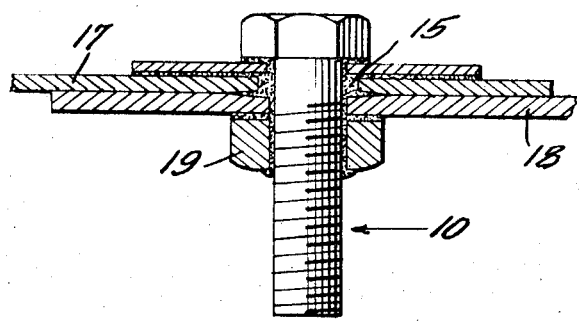
MALCOLM B. PEARCE, JR. INVENTOR
BY *J. Rodney Leck*
ATTORNEY

United States Patent Office 3,469,490
Patented Sept. 30, 1969

3,469,490
SELF-SEALING MECHANICAL FASTENER
Malcolm B. Pearce, Jr., Durham, Conn., assignor to Loctite Corporation, Newington, Conn., a corporation of Connecticut
Filed Oct. 18, 1967, 676,336
Int. Cl. F16b 29/00, 19/04, 43/00
U.S. Cl. 85—1                    4 Claims

ABSTRACT OF THE DISCLOSURE

Self-sealing mechanical fasteners including a head portion having a flattenable or collapsible dish-shaped portion and a liquid sealant retained in the hollow of the dished head, preferably via a pressure rupturable shell. In use, the dished head seals around its periphery against the surface of the item to be fastened before the fastener is completely seated in place, and upon further tightening the dished portion flattens, and the liquid sealant is released from the shell and forced under pressure into any clearance around the fastener.

Background of the invention

This invention deals with mechanical fastening devices, such as screws, nuts and bolts, rivets, studs and the like. Frequently these fasteners are used in applications where sealing of the fastened assembly is essential, such as on pressure or vacuum vessels or to provide absolute seals against seepage or leaking.

In the past, the most common means for maintaining a seal around a mechanical fastener of the type in question have been auxiliary sealing devices, such as flexible washers and liquid or paste sealants applied to the fastener assembly at the time of use. Needless to say, such measure are time consuming and often cumbersome for a variety of reasons. Further, washers often tend to lose their sealing ability with age, or because of reaction with materials to which they are exposed in the atmosphere or otherwise.

Recently, some success has been obtained by the use of micro-encapsulated sealing materials deposited on the threads of threaded fasteners or on the shank of non-threaded fasteners or, in the case of two component sealants (e.g., epoxy resins), on separate but adjacent portions of the fastener. See, for example, United States Patents 3,061,455 to Anthony, issued Oct. 30, 1962, and 3,179,143 to Schultz et al., issued Apr. 20, 1965. When the fastener is used in the appropriate manner, the capsules are ruptured or the components mixed and the sealant coats and seals the contact area. Since the sealant is released (or compounded) in situ within the fastener contact area, it achieves an internal seal which is more effective and more durable than the essentially external seal given by a washer or externally applied liquid sealant. When this sealant also serves an adhesive function, an auxiliary benefit is obtained due to the increase in the holding power of the fastener. Naturally, the adhesive material must be capable of hardening in place to be capable of serving this adhesive function.

Unfortunately, certain practical problems are encountered in the application of micro-encapsulated sealants to mechanical fasteners in the manner described above. Of necessity, the capsules are subject to abuse because of their location on an exposed portion of the fastener, resulting in loss of capsules from the fastener surface or rupture of large numbers of casules prior to use. The result is that fasteners frequently contain insufficient amounts of sealant to perform the desired function, or even worse, are unusable due to hardening of the sealant which has escaped from the capsules and perhaps even bonded a number of the fasteners together. Similar problems are experienced in dealing with other types of sealants which are applied to the sealing surfaces, such as the two-component sealants discussed above.

A more fundamental difficulty is inherent in the disposition of the sealant, regardless of form, on the sealing surfaces of the fastener. Many fasteners have a close fit with the part being fastened or with a co-operating engaging element (e.g., a nut) and the presence of a layer of capsules can readily interfere with the introduction of the fastener into the opening of the part or element. Moreover, the sealant intereferes with the tightening of the fastener which necessitates the application of disproportionately large tightening forces to complete the fastening operation. This problem is particularly acute when the sealant also serves an adhesive function since nearly all appropriate adhesive materials are quite viscous and significantly impede the tightening of the fastener.

A self-sealing fastener which avoided these problems of the prior art would be an extremely novel and useful item.

The invention

The subject of this invention is a mechanical fastener which provides internal sealing without objectionable interference by the sealant with the fastening operation. More specifically, the invention concerns a mechanical fastener having a shank portion for penetrating surfaces to be joined and a head portion drawn into abutting contact with one of said surfaces as the fastener is tightened, the head portion including a flattenable, collapsible or dish-shaped flange or skirt carrying on its concave surface a flowable or liquid sealant, preferably contained within capsules or other pressure-rupturable shell. In use, the periphery of the flange or skirt seats or fits against one of the surfaces to be joined as the fastener is put in place. Upon completion of the fastening operation by the application of pressure axially of said fastener, the flange or skirt flattens, rupturing the shell containing the liquid sealant; since the sealant cannot escape under the peripheral edge, it is forced under pressure into the interior of the joint between the fastener and the joined parts.

Brief description of the drawings

The attached drawings illustrate several typical embodiments of the invention disclosed herein.

FIG. 1 is a view in side elevation of a bolt associated with a separate dish-shaped washer carrying the sealant;

FIG. 2 is a similar view of a wood screw in which a dished skirt is formed integrally with the screw head to carry the sealant;

FIG. 3 is a like view of a rivet including a head, which may be laterally extended, of concave-convex configuration with the concavity filled with sealant; and FIG. 4 is a detail view, partially in section, and partially in side elevation, of a sheet metal joint secured by the bolt of FIG. 1, showing the penetration of the sealant around the fastener and into the contiguous area of the joint.

Description of the invention and its preferred embodiments

Referring now more particularly to the drawings, the bolt generally designated 10 in FIG. 1 includes a threaded shank portion 11 and a head portion 12 formed as a standard hexagonal head. Encircling the bolt shank directly proximate the inner face of head portion 12 is an annular washer or flnage 14 of dished shape with the concavity opening away from the head and containing a deposit of micro-encapsulated liquid sealant 15. The washer 14 can be formed separately from the bolt as shown and applied in place as needed, or press-fitted into more or less fixed relation on the upper end of shank portion 11, or otherwise associated with the bolt as may be desired.

FIG. 2 illustrates a wood screw having a threaded shank portion 21 and a head portion designated 22 that is slotted in the usual manner at 23, the head portion 22 being formed with an integral flange or skirt portion 24. On the underside of the skirt is a deposit of liquid sealant 25 retained by a pressure-rupturable membrane or diaphragm 26.

The embodiment of FIG. 3 shows the invention applied to a rivet which includes a shank portion 31 and a head portion composed of an impact portion 33 and a unitary flange portion 34 extending the curvature of impact portion 33. On the underside of flange portion 34 is a layer of microcapsules of liquid sealant 35.

As each of the fasteners described in the drawings is applied in working position in the standard manner, contact is made between the surface to be fastened and the peripheral edge of the flange or skirt portions 14, 24, 34 before the fastener is seated fully against such surface. This contact, in effect, seals the concavity in which the liquid sealant is deposited. Thus, completion of the fastening operation results in flattening of the dished portion of the fastener against the surface, thereby releasing liquid sealant from its pressure-rupturable shell. Since the liquid sealant is held between the flange or skirt and the surface to be fastened, it is forced under the pressure of the advancing head into the mating surfaces of the joint and into the clearances around the fastener shank.

FIG. 4 illustrates in more or less idealized manner a representative completed assembly using one of the fasteners of this invention, specifically the bolt of FIG. 1 with a cooperating nut 19 for joining two metal sheets 17, 18. The heavy shading 15 depicts the position occupied by the liquid sealant as a result of the pressure of the advancing head assembly and the flattening of the dished flange 14, the sealant penetrating between the metal sheets and into and around the various portions of the fastening device. It will be apparent that a completely sealed assembly has been accomplished merely as a consequence of using one of the fasteners of this invention.

The invention disclosed herein can be used on a wide range of mechanical fasteners, specifically any fastener which passes through or into the items to be fastened, and applies a compressive force to the items to hold them in place. Therefore, the specific configurations of fasteners as shown in the drawings is not a limitation upon the broad concept of the invention disclosed herein. Typical examples of suitable fasteners are studs, nuts and bolts, screws, nails and rivets, among others. Threaded fasteners have been found to be particularly efficient for use in the operation described herein because of the relatively slow uniform increase in pressure which is obtained in fastening, and consequently are considered a preferred embodiment of the invention.

Likewise, the exact configuration of the fastener head generally and of the dished section or member are not limitations upon this invention, provided the dished section is equipped with a substantially continuous leading edge arranged to engage and seal against one of the surfaces to be joined prior to completion of the fastening operation, thus preventing escape of a substantial amount of the liquid sealant through or around any portion of the head prior to complete fastening. In this manner as the arched or dished member is flattened, the liquid is expelled from the pressure-rupturable shell and forced under the pressure of the advancing head assembly into the mating surfaces giving a complete seal of the fastener assembly. The dished member can have curved or straight sides (as in FIGS. 1 and 2, respectively), a bellows type structure, or any other configuration capable of producing the results described above. Further, the dished member can be formed as an integral part of the fastener head (as in FIGS. 2 and 3), or as a separate item which is associated with the head assembly at the time of use (as with the dish-shaped washer in FIG. 1).

In the event the sealing action is desired primarily around the periphery of the fastener head, as might be the case for instance with roofing nails, the sealant could be concentrated at the head periphery, as within an annular channel extending adjacent the periphery, the leading edges on both sides of the channel engaging the working surface first as the nails are driven into place and then collapsing to squeeze the sealant into effective sealing position. Similarly, maximum sealing action around the shank of the fastener can be achieved by confining the sealant to the area proximate the shank. Thus, the dished section could carry a continuous leading edge near the shank wall and defining with that wall a channel located well within the peripheral limits of the head. Other arrangements of sealant relative to the head are equally possible. For example, if the principal function of the sealant were to prevent the fastener from working loose under vibration or the like, the sealant could be confined to spots or other areas smaller than the entire inner working surface of the head.

The liquid sealant used in the fasteners of this invention can be any composition capable of providing a sealing or adhesive function necessary for the particular use for which the mechanical fastener is intended. Frequently, any liquid sealant capable of remaining in the fastener assembly under low or moderate pressure will suffice. Preferably, however, the liquid sealant is one which will harden after being forced into the fastener assembly. For example, a two part encapsulated epoxy resin can be used if the components are separately encapsulated, the capsules mixed and then applied to the dished member of the fastener as described herein. The two components automatically will be mixed during use of the fastener and the epoxy resin will harden in the conventional fashion. The most highly preferred liquid sealant is an anaerobically curing sealant which remains liquid in the presence of oxygen but which hardens in the absence of oxygen (such as when forced into a fastener assembly as described herein). Typical examples of sealants of this type are acrylate esters which, in the presence of peroxy catalysts, remain liquid when exposed to oxygen but which polymerize in the absence of oxygen to form hard, durable resins. Of particular utility are polymerizable di- and poly-acrylate esters, such as the polyalkylene glycol dimethacrylates.

The catalyst to be used with the above acrylate or polyacrylate esters can be classed as "peroxy initiators." Preferred examples of these initiators are the organic hydroperoxides, such as cumene hydroperoxide. However, other peroxy initiators can be used such as hydrogen peroxide, organic peroxides, or material such as peresters which degenerate to form peroxides. When peroxy initiators other than organic hydroperoxides are used, however, they preferably are used in conjunction with one or more additives which provide stability during storage and/or acceleration during cure in the absence of air. For a complete description of these anaerobic sealant systems, and particularly for a complete description of suitable acrylate and polyacrylate esters, peroxy initiators and various additives for use in combination therewith, reference is made to the following United States Patents: 2,895,950 to Vernon K. Krieble, issued July 21, 1959; 3,041,322 to Vernon K. Krieble, issued June 26, 1962; 3,043,820 to Robert H. Krieble, issued July 10, 1962; 3,046,262 to Vernon K. Krieble, issued July 24, 1962; 3,203,941 to Vernon K. Krieble, issued Aug. 31, 1965; and 3,218,305 to Vernon K. Krieble, issued Nov. 16, 1965. Sealants of this type are especially desirable because they can be formulated with nearly any viscosity desired, thereby insuring easy penetration of and retention in the fastener assembly. A preferred viscosity range is from about 10 to about 1,000 centipoises.

The liquid sealant can be retained within the dished member or section of the fastener head by any pressure-rupturable wall or shell, i.e., an enclosing film layer, which will rupture or otherwise release the liquid sealant as the dished member flattens during the fasening operation. Two convenient ways in which this can be accomplished are as follows:

(a) Place a pool of liquid sealant in the concavity of the dished member of the head and cover the liquid sealant with a film forming substance to form a retaining membrane over the pool of liquid. A thin layer of many common waxes, cellulose derivatives, natural gums, gelatin or the like is suitable for this purpose. This technique is particularly useful when the dished member forms an integral part of the head assembly, as in FIG. 2. In a preferred aspect, when a polymerizable liquid is used as the liquid sealant, the liquid can be "skinned over" by contact with a substance capable of promoting polymerization of the liquid monomer. For example, the acrylate or polyacrylate ester compositions disclosed above can be exposured to certain gases such as sulfur dioxide which will promote formation of a polymer skin over the remainder of the liquid. This skin is capable of containing the liquid until the fastener is used as described above.

(b) The liquid sealant can be encapsulated and the capsules adhered to the interior portion of the dished head member. This technique is particularly useful when the dished member is separate from the fastener head assembly, as in FIG. 1. A number of suitable processes are available for encapsulating liquids, such as the liquid sealants disclosed herein. See, for example, United States Patents 2,800,458 to Green et al, issued July 23, 1957, and 3,111,708 to Watt, issued Nov. 26, 1963. Capsules of the liquid sealant conveniently can be applied to the interior portion of the dished member by use of any of a number of common adhesives, such as aqueous based gum adhesives.

When the preferred anaerobic liquid sealants are used, the shell material which is chosen must be sufficiently permeable to permit atmospheric oxygen to reach the liquid and prevent the anaerobic sealant from hardening. Present experience indicates, however, that the majority of available shell materials will present no difficulty in this regard, particularly if reasonably thin shell walls are used.

It is to be understood that the embodiments of the present invention as shown and described herein are to be regarded as illustrative only and that the invention is susceptible to variations, modification, and changes.

I claim:

1. A self-sealing mechanical fastener having a shank portion for penetrating surfaces to be joined and a head portion for seating against one of said surfaces when the fastener is in a working position, said head portion including a concavity defined by a wall extending circumferentially of said head portion and angularly toward said shank portion, said concavity being adapted to collapse under pressure applied axially of said fastener and having retained therein microcapsules of a single phase sealant having a viscosity between about 10 and about 1000 centipoises, said sealant comprising a polymerizable acrylate ester monomer and a hydroperoxide polymerization initiator.

2. The fastener of claim 1 wherein said wall is the inner face of an annular flange formed integrally with said head portion and extending laterally and forwardly toward said shank portion.

3. The fastener of claim 1 wherein said wall is the inner face of a separate annular dish-shaped member, said fastener having its shank portion passing through the interior opening of said annular member and its head portion abutting the margin of said interior opening on the side of said member opposite to said concavity.

4. The fastener of claim 1 wherein the shank portion is threaded.

References Cited

UNITED STATES PATENTS

| | | | |
|---|---|---|---|
| 2,772,903 | 12/1956 | Sussenbach | 85—50 |
| 2,895,950 | 7/1959 | Krieble | 260—89.5 |
| 2,927,495 | 3/1960 | Barwood | 85—1 |
| 2,939,805 | 6/1960 | Johnson | 151—14.5 |
| 2,943,661 | 7/1960 | Stern | 85—50 |
| 2,945,524 | 7/1960 | Becker. | |
| 3,016,941 | 1/1962 | Coldren | 151—38 |
| 3,041,322 | 6/1962 | Krieble | 260—89.5 |
| 3,061,455 | 10/1962 | Anthony | 151—14.5 |
| 3,179,143 | 4/1965 | Schultz et al. | 151—41.7 |
| 3,312,929 | 4/1967 | Shannon | 151—41.7 |

FOREIGN PATENTS

| | | |
|---|---|---|
| 227,713 | 4/1960 | Australia. |
| 990,402 | 4/1965 | Great Britain. |
| 372,878 | 12/1963 | Switzerland. |

OTHER REFERENCES

Parker–Kalon Publication, published February 1958, p. 1 pertinent.

MARION PARSONS, JR., Primary Examiner

U.S. Cl. X.R.

85—9, 37; 151—41.7; 287—189.36